United States Patent [19]
Bell et al.

[11] Patent Number: 5,502,126
[45] Date of Patent: Mar. 26, 1996

[54] PROCESS FOR THE SYNTHESIS OF ISOPRENE BUTADIENE RUBBER

[75] Inventors: Anthony J. Bell, Stow; Barry A. Matrana, Akron; Adel F. Halasa, Bath, all of Ohio

[73] Assignee: The Goodyear Tire & Rubber Company, Akron, Ohio

[21] Appl. No.: 330,468

[22] Filed: Oct. 28, 1994

Related U.S. Application Data

[62] Division of Ser. No. 77,633, Jun. 17, 1993, Pat. No. 5,405,815.

[51] Int. Cl.$^6$ .......................... C08F 4/52; C08F 236/08
[52] U.S. Cl. .......................... 526/142; 526/114; 526/115; 526/122; 526/128; 526/133; 526/136; 526/137; 526/140; 526/151; 526/144; 526/153; 526/157; 526/161; 526/163; 526/164; 526/337; 502/102; 502/154
[58] Field of Search .......................... 526/128, 140, 526/142, 157, 163, 164, 137, 114, 115, 122, 133, 136, 144, 151, 153, 161; 502/154

[56] References Cited

U.S. PATENT DOCUMENTS

| | | | |
|---|---|---|---|
| 4,429,089 | 1/1984 | Pedretti et al. | 526/337 X |
| 4,736,001 | 4/1988 | Carbonaro et al. | 526/142 X |

*Primary Examiner*—Fred Teskin
*Attorney, Agent, or Firm*—Alvin T. Rockhill

[57] ABSTRACT

The subject invention relates to a technique for synthesizing rubbery non-tapered, random, copolymers of 1,3-butadiene and isoprene. These rubbery copolymers exhibit an excellent combination of properties for utilization in tire sidewall rubber compounds for truck tires. By utilizing these isoprene-butadiene rubbers in tire sidewalls, tires having improved cut growth resistance can be built without sacrificing rolling resistance. Such rubbers can also be employed in tire tread compounds to improve tread wear characteristics and decrease rolling resistance without sacrificing traction characteristics. This invention more specifically discloses a process for the synthesis of isoprene-butadiene rubbers which comprises copolymerizing isoprene monomer and 1,3-butadiene monomer in an organic solvent in the presence of a catalyst system which is made by the sequential steps of (1) mixing (a) an organoaluminum hydride, (b) a member selected from the group consisting of aliphatic alcohols, cycloaliphatic alcohols, aliphatic thiols, cycloaliphatic thiols, trialkyl silanols, and triaryl silanols, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; and (3) adding a compound which contains at least one labile halogen atom to the Group III-B metal containing catalyst component.

24 Claims, No Drawings

PROCESS FOR THE SYNTHESIS OF ISOPRENE BUTADIENE RUBBER

This is a divisional of application Ser. No. 08/077,633, filed on Jun. 17, 1993, now issued as U.S. Pat. No. 5,405,815.

BACKGROUND OF THE INVENTION

In the copolymerization of 1,3-butadiene and isoprene with unmodified neodymium catalysts, the 1,3-butadiene polymerizes about 19 times faster than the isoprene. For this reason, such copolymers do not have a random distribution of monomers. One end of the polymer chains contain mostly repeat units which are derived from butadiene (which polymerized faster) and the other end of the polymer chains contain mostly repeat units which are derived from isoprene (which polymerized slower). As the polymerization proceeds, the availability of butadiene monomer for polymerization diminishes leaving more and more isoprene to polymerize subsequently. This causes such isoprene-butadiene rubbers to be tapered.

U.S. Pat. No. 4,663,405 discloses that conjugated diolefin monomers can be polymerized with a catalyst system which is comprised of (1) an organoaluminum compound, (2) an organometallic compound which contains a metal from Group III-B of the Periodic System, such as lanthanides and actinides, and (3) at least one compound which contains at least one labile halogen atom. U.S. Pat. No. 4,663,405 also discloses that the molecular weight of the polymers made with such catalyst systems can be reduced by conducting the polymerization in the presence of a vinyl halide. However, its teachings do not specifically disclose copolymerizations of isoprene with butadiene and do not provide any technique for making the isoprene monomer polymerize at a rate which is similar to that of the butadiene monomer. Thus, its teachings do not provide a technique for synthesizing random, non-tapered isoprene-butadiene rubbers with catalyst systems which are comprised of (1) an organoaluminum compound, (2) an organometallic compound which contains a metal from Group III-B of the Periodic System, such as lanthanides and actinides, and (3) at least one compound which contains at least one labile halogen atom.

SUMMARY OF THE INVENTION

It has been unexpectedly found that rubbery copolymers of butadiene and isoprene which are random and non-tapered can be synthesized with the catalyst systems of this invention. These rubbery copolymers exhibit an excellent combination of properties for utilization in tire sidewall rubber compounds for truck tires. By utilizing these isoprene-butadiene rubbers in tire sidewalls, tires having improved cut growth resistance can be built without sacrificing rolling resistance. The isoprene-butadiene rubbers made by the process of this invention can also be employed in tire tread rubber compounds to improve the tread wear characteristics and decrease the rolling resistance of the tire without sacrificing traction characteristics.

This invention more specifically discloses a process for the synthesis of isoprene-butadiene rubbers which comprises copolymerizing isoprene monomer and 1,3-butadiene monomer in an organic solvent in the presence of a catalyst system which is made by the sequential steps of (1) mixing (a) an organoaluminum hydride, (b) a member selected from the group consisting of aliphatic alcohols, cycloaliphatic alcohols, aliphatic thiols, cycloaliphatic thiols, trialkyl silanols, and triaryl silanols, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; and (3) adding a compound which contains at least one labile halogen atom to the Group III-B metal containing catalyst component.

The subject invention further discloses a process for preparing a catalyst system which is particularly useful for copolymerizing isoprene and 1,3-butadiene monomers into rubbers which comprises the sequential steps of (1) mixing (a) an organoaluminum hydride, (b) a member selected from the group consisting of aliphatic alcohols, cycloaliphatic alcohols, aliphatic thiols, cycloaliphatic thiols, trialkyl silanols, and triaryl silanols, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; and (3) adding a compound which contains at least one labile halogen atom to the Group III-B metal containing catalyst component.

The subject invention further reveals a catalyst system which is characterized by being prepared by the sequential steps of (1) mixing (a) an organoaluminum hydride, (b) a member selected from the group consisting of aliphatic alcohols, cycloaliphatic alcohols, aliphatic thiols, cycloaliphatic thiols, trialkyl silanols, and triaryl silanols, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; and (3) adding a compound which contains at least one labile halogen atom to the Group III-B metal containing catalyst component.

DETAILED DESCRIPTION OF THE INVENTION

The relative amount of isoprene and butadiene, which can be copolymerized with the catalyst system of this invention, can vary over a wide range. For example, the monomer charge composition can contain from about 1 weight percent to about 99 weight percent butadiene and from about 1 weight percent to 99 weight percent isoprene. In most cases, the monomer charge composition will contain from about 10 weight percent to about 90 weight percent butadiene and from about 10 weight percent to 90 weight percent isoprene. It is normally preferred for the monomer charge composition to contain from about 25 weight percent to about 75 weight percent butadiene and from about 25 weight percent to about 75 weight percent isoprene. It is generally more preferred in the case of automobile tires for the monomer charge composition to contain from about 50 weight percent to about 75 weight percent butadiene and from about 25 weight percent to about 50 weight percent isoprene. It is generally more preferred in the case of truck tires for the monomer charge composition to contain from about 25 to 50 weight percent 1,3-butadiene and 50 to 75 weight percent isoprene.

The polymerizations of the present invention are carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations which utilize the catalyst systems of this invention, there will normally be from 5 to 35 weight percent monomers in the polymerization medium. Such polymerization mediums are, of course, comprised of an organic solvent, 1,3-butadiene monomer, isoprene monomer, and the catalyst system. In most cases, it will be preferred for the polymerization medium to contain from 10 to 30 weight percent monomers. It is generally more preferred for the polymerization medium to contain 12 to 18 weight percent monomers.

The catalyst system used in the process of this invention is made in a three step process. In the first step, an organoaluminum hydride is mixed with an alcohol or a thiol and optionally, 1,3-butadiene. To attain good polymerization rates and high conversions, 1,3-butadiene will be mixed with the organoaluminum hydride and the alcohol or thiol in making the modified organoaluminum catalyst component. These three components (the organoaluminum hydride, the alcohol or thiol, and the 1,3-butadiene) can be mixed in any order. The organoaluminum hydride can be mixed with the alcohol or thiol in the presence of the 1,3-butadiene or the 1,3-butadiene can be added later. However, it is highly preferred to add the alcohol or thiol to the organoaluminum compound rather than adding the organoaluminum compound to the alcohol or thiol. This step is, of course, conducted in an inert organic solvent. Some representative examples of suitable inert organic solvents include pentane, isooctane, cyclohexane, normal hexane, benzene, toluene, xylene, ethylbenzene, and the like, alone or in admixture.

The molar ratio of the organoaluminum hydride to the alcohol or thiol will typically be within the range of about 3:2 to about 150:1. The molar ratio of the organoaluminum hydride to the alcohol or thiol will more typically be within the range of about 2:1 to about 100:1. As a general rule, it is more preferred for the molar ratio of the organoaluminum hydride to the alcohol or thiol to be within the range of about 5:2 to about 25:1. It is highly preferred for the ratio of the organoaluminum hydride to the alcohol or thiol to be within the range of about 3:1 to about 15:1.

It is not absolutely necessary to utilize any 1,3-butadiene in making the modified organoaluminum catalyst component. The molar ratio of the 1,3-butadiene to the organometallic compound which contains a metal from Group III-B of the Periodic System used in making the catalyst system will normally be greater than 3:1. The molar ratio of the 1,3-butadiene to the organometallic compound which contains a metal from Group III-B of the Periodic System used in making the catalyst system will typically be within the range of about 5:1 to about 100:1. The molar ratio of the 1,3-butadiene to the organometallic compound which contains a metal from Group III-B of the Periodic System used in making the catalyst system will more typically be within the range of about 10:1 to about 30:1. As a general rule, it is more preferred for the molar ratio of the 1,3-butadiene to the organometallic compound to be within the range of about 15:1 to about 25:1.

In this first step, a portion of the organoaluminum hydride is modified with the alcohol or thiol. However, it is important for there to be an excess of organoaluminum hydride because if all of it is modified, the catalyst system will not be active. The chemical reaction which takes place in cases where an alcohol is employed in the modification step can be depicted as follows:

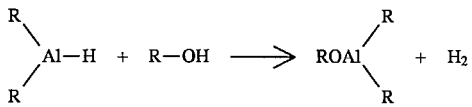

wherein R represents an alkyl group. In cases where a silanol is used in the modification step, the reaction proceeds as follows:

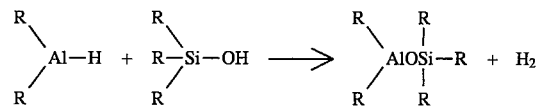

wherein R represents an alkyl group. This reaction results in the formation of a modified organoaluminum catalyst component.

The organoaluminum hydrides which can be used have the structural formula:

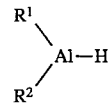

wherein $R^1$ and $R^2$ can be the same or different and represent alkyl groups containing from 1 to about 12 carbon atoms. Normally $R^1$ and $R^2$ will represent alkyl groups which contain from about 2 to about 8 carbon atoms. More commonly, $R^1$ and $R^2$ will represent alkyl groups which contain about 3 to about 6 carbon atoms.

The alcohols and thiols which can be used include aliphatic alcohols, cycloaliphatic alcohols, aliphatic thiols, cycloaliphatic thiols, trialkyl silanols, and triaryl silanols. Virtually any aliphatic alcohol or cycloaliphatic alcohol can be employed. However, the alcohol will typically contain from 1 to about 12 carbon atoms. Alcohols which contain more than one hydroxyl group, such as diols, can also be used. Some representative examples of suitable alcohols include methanol, ethanol, normal-propyl alcohol, isopropyl alcohol, n-butyl alcohol, t-butyl alcohol, 1-pentanol, 1-hexanol, 1-hepthanol, 1-octanol, ethylene glycol, butane diol, and the like. Since 1-butanol (n-butyl alcohol) is soluble in many organic solvents, such as hexane, it is highly preferred.

Virtually any aliphatic thiol or cycloaliphatic thiol can be employed. However, the thiol will typically contain from 1 to about 12 carbon atoms. Thiols which contain more than one mercaptan group can also be used. The thiols which can be used typically have the structural formula R—SH wherein R represents an alkyl group or an aryl group containing from 1 to about 12 carbon atoms. Some representative examples of thiols which can be used include methyl mercaptan, ethyl mercaptan, n-propyl mercaptan, n-butyl mercaptan, t-butyl mercaptan, n-pentyl mercaptan, n-hexyl mercaptan, and the like.

The trialkyl silanols which can be used have the structural formula:

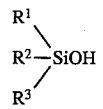

wherein $R^1$, $R^2$, and $R^3$ can be the same or different and represent alkyl groups which contain from 1 to about 12 carbon atoms. The triaryl silanols which can be used are generally of the structural formula:

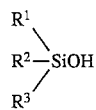

wherein $R^1$ represents an aryl group which contains from 6 to 12 carbon atoms, and wherein $R^2$ and $R^3$ can be the same or different and represent alkyl groups containing from 1 to 12 carbon atoms or aryl groups which contain from 6 to 12 carbon atoms.

In the second step of the catalyst preparation procedure, a Group III-B metal containing organometallic compound is added to the modified organoaluminum catalyst component made in the first step. The modified organoaluminum catalyst component made in the first step is, of course, a mixture of both modified and unmodified organoaluminum hydride. The second step results in the formation of a Group III-B metal containing catalyst component. The molar ratio of the amount of the organometallic compound added to the amount of aluminum in the modified organoaluminum catalyst component will be within the range of about 1:6 to about 1:40. It is generally preferred for the molar ratio of the organolanthanide compound to the organoaluminum compound to be within the range of about 1:8 to about 1:25. It is normally more preferred for the molar ratio of the organolanthanide compound to the organoaluminum compound to be within the range of about 1:11 to about 1:20. Polymerization rates generally increase as the ratio of unreacted organoaluminum hydride (organoaluminum hydride which has not been modified with the alcohol or thiol) to the Group III-B metal containing organometallic compound increases. However, as the ratio of unreacted organoaluminum hydride to the organometallic compound is increased, the molecular weight and Mooney viscosity of the isoprene-butadiene rubber decreases.

The Group III-B metal containing organometallic compounds which can be employed may be symbolically represented as $ML_3$ wherein M represents the Group III-B metal and wherein L represents an organic ligand containing from 1 to about 20 carbon atoms. The Group III-B metal will be selected from the group consisting of scandium, yttrium, lanthanides, and actinides. It is normally preferred for the Group III-B metal to be a lanthanide. The organic ligand will generally be selected from the group consisting of (1) o-hydroxyaldehydes, (2) o-hydroxyphenones, (3) hydroxyesters, (4) β-diketones, (5) monocarboxylic acids, (6) ortho dihydric phenols, (7) alkylene glycols, (8) dicarboxylic acids, and (9) alkylated derivatives of dicarboxylic acids.

The lanthanides which can be used in the organolanthanide compound include lanthanum, cerium, praseodymium, neodymium, promethium, samarium, europium, gadolinium, terbium, dysprosium, holmium, erbium, thulium, ytterbium, and lutetium. The preferred lanthanide metals include cerium, praseodymium, neodymium, and gadolinium which have atomic numbers of 58, 59, 60, and 64, respectively. The most preferred lanthanide metal is neodymium.

In the organolanthanide compound utilized, the organic portion includes organic type ligands or groups which contain from 1 to 20 carbon atoms. These ligands can be of the monovalent and bidentate or divalent and bidentate form. Representative of such organic ligands or groups are (1) o-hydroxyaldehydes such as salicylaldehyde, 2-hydroxyl-1-naphthaldehyde, 2-hydroxy-3-naphthaldehyde and the like; (2) o-hydroxyphenones such as 2'-hydroxyacetophenone, 2'-o-hydroxybutyrophenone, 2'-hydroxypropiophenone and the like; (3) hydroxy esters such as ethyl salicylate, propyl salicylate, butyl salicylate and the like; (4) β-diketones such as acetylacetone, benzoylacetone, propionylacetone, isobutyrylacetone, valerylacetone, ethylacetylacetone and the like; (5) monocarboxylic acids such as acetic acid, propionic acid, valeric acid, hexanoic acid, 2-ethylhexanoic acid, neodecanoic acid, lauric acid, stearic acid and the like; (6) ortho dihydric phenols such as pyrocatechol; (7) alkylene glycols such as ethylene glycol, propylene glycol, trimethylene glycol, tetramethylene glycol and the like; (8) dicarboxylic acids such as oxalic acid, malonic acid, maleic acid, succinic acid, o-phthalic acid and the like; and (9) alkylated derivatives of the above-described dicarboxylic acids.

Representative organolanthanide compounds corresponding to the formula $ML_3$, which may be useful in this invention include cerium acetylacetonate, cerium naphthenate, cerium neodecanoate, cerium octanoate, tris-salicylaldehyde cerium, cerium tris-8-hydroxyquinolate), gadolinium naphthenate, gadolinium neodecanoate, gadolinium octanoate, lanthanum naphthenate, lanthanum octanoate, neodymium naphthenate, neodymium neodecanoate, neodymium octanoate, praseodymium naphthenate, praseodymium octanoate, yttrium acetylacetonate, yttrium octanoate, dysprosium octanoate, and other lanthanide metals complexed with ligands containing from 1 to about 20 carbon atoms.

The actinides which can be utilized in the Group III-B metal containing organometallic compound include actinium, thorium, protactinium, uranium, neptunium, plutonium, americium, curium, berkelium, californium, einsteinium, fermium, mendelevium, and lawrencium. The preferred actinides are thorium and uranium which have atomic numbers of 90 and 92, respectively. Some representative examples of organoactinides which can be employed include tris(π-allyl) uranium chloride, tris(π-allyl) uranium bromide, tris(π-allyl) uranium iodide, uranium tetramethoxide, uranium tetraethoxide, uranium tetrabutoxide, uranium octanoate, thorium tetraethoxide, tris(π-allyl) thorium chloride, thorium naphthenate, uranium isovalerate, thorium octanoate, tris(π-allyl) thorium bromide, tris(π-allyl) thorium iodide, thorium tetramethoxide, and the like.

In the third and final step of the catalyst preparation procedure a compound which contains at least one labile halogen atom is added to the Group III-B metal containing catalyst component produced in the second step. The molar ratio of the amount of the compound containing the labile halogen atom added to the Group III-B metal in the Group III-B metal containing catalyst component will normally be within the range of about 1:1 to about 5:1. It is generally preferred for the molar ratio of the labile halogen atom containing compound to the Group III-B metal to be within the range of about 3:2 to about 3:1. It is normally more preferred for the ratio of the labile halide containing compound to the Group IIIB metal in the Group IIIB metal containing compound component to be within the range of 1.8:1 to about 5:2.

The labile halogen atom containing compound will normally contain a labile bromine atom, chlorine atom, fluorine atom, or iodine atom. A combination of two or more of these labile halogen atoms in the same or different compounds can also be utilized. These halogen atoms can be introduced as (1) tertiary alkyl halides; (2) secondary alkyl halides; (3) aralkyl halides; (4) allyl halides; (5) hydrogen halides; (6) alkyl, aryl, alkaryl, aralkyl and cycloalkyl metal halides wherein the metal is selected from the Groups II, III-A and IV-A of the Periodic Table; (7) metallic halides, such as halides of metals of Groups III, IV, V, VI-B and VIII of the Periodic Table; (8) halosilanes; (9) halosulfides; (10) halophosphines; and (11) organometallic halides corresponding to the general formula $ML_{(3-y)}X_y$ wherein M is a metal selected from the group consisting of metals of Group III-B of the Periodic Table having atomic numbers of 21, 39, and 57 through 71 inclusive; L is an organic ligand containing from 1 to 20 carbon atoms and selected from the group consisting of (a) o-hydroxyaldehydes, (b) o-hydroxyphenones, (c) hydroxyquinolines, (d) β-diketones, (e) monocarboxylic acids, (f) ortho dihydric phenols, (g) alkylene glycols, (h) dicarboxylic acids, (i) alkylated derivatives of dicarboxylic acids and (j) phenolic ethers; X is a halogen atom and y is an integer ranging from 1 to 2 and representing the number of halogen atoms attached to the metal M. The organic ligand L may be of the monovalent and bidentate or divalent and bidentate form.

Representative examples of such compounds containing labile halogen atoms include (1) inorganic halide acids, such as hydrogen bromide, hydrogen chloride and hydrogen iodide; (2) organometallic halides, such as ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) inorganic halides such as aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like; and (4) organometallic (Group III-B) halides, such as t-butyl-salicylaldehydrocerium (III) chloride, salicylaldehydrocerium (III) chloride, 5-cyclohexylsalicylaldehydrocerium (III) chloride, 2-acetylphenolatocerium (III) chloride, oxalatocerium (III) chloride, oxalatocerium (III) bromide and the like; (5) tertiary alkyl halides, such as t-butyl bromide and t-octyl bromide; (6) secondary alkyl halides, such as isopropyl bromide and isopropyl chloride; (7) aralkyl halides, such as benzyl bromide and bromomethyl naphthalene; and (8) allyl halides, such as allyl bromide, 3-chloro-2-methylpropene, 1-bromobutene- 2, and 1-bromopentene-2. The preferred compounds which contain labile halogen atoms are benzyl halides and allyl halides.

After the labile halogen atom containing compound is added, it is preferred to "age" the catalyst system at a temperature which is within the range of about 20° C. to about 100° C. for a period of about 10 minutes to about 6 hours before use. It is generally more preferred to age the catalyst system at a temperature which is within the range of about 30° C. to 85° C. and it is typically most preferred to age the catalyst system at a temperature which is within the range of about 40° C. to about 65° C. It is more preferred to age the catalyst system for a period of about 20 minutes to about 4 hours with it being most preferred to age the catalyst system for a period of 30 minutes to 90 minutes.

The catalyst system made can then be employed to catalyze the copolymerization of isoprene and 1,3-butadiene monomers. This can be accomplished by simply adding the catalyst system to the polymerization medium which contains the isoprene, the 1,3-butadiene, and the organic solvent. It will typically be added at a level sufficient to provide from 0.05 to 0.5 millimoles of the Group III-B metal per 100 grams of total monomer. More typically, the catalyst system will be added in an amount sufficient to provide from 0.25 to 0.35 millimoles of the Group III-B metal per 100 grams of total monomer. Its use results in the formation of an essentially non-tapered, random isoprene-butadiene rubber which has excellent characteristics for use in making tires. This is due to the fact that the modification procedure causes the catalyst system to polymerize the butadiene monomer at a rate which is only about 1.2 times to 1.5 times faster than the rate of isoprene polymerization. It should be noted that in cases where the organoaluminum hydride is not modified with a thiol or an alcohol, the butadiene monomer polymerizes at a rate which is about 20 times faster than the rate at which the isoprene polymerizes.

The polymerization temperature utilized can vary over a broad range of from about 0° C. to about 125° C. In most cases a temperature within the range of about 30° C. to about 85° C. will be utilized. Temperatures within the range of about 50° C. to about 75° C. are generally the most preferred polymerization temperatures. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique.

The isoprene-butadiene rubbers, which are made by utilizing the techniques of this invention in solution polymerizations, can be recovered utilizing conventional techniques. It may be desirable to add antioxidants to the polymer solution in order to protect the isoprene-butadiene rubber produced from potentially deleterious effects of contact with oxygen. The isoprene-butadiene rubber made can be precipitated from the polymer solution. The styrene-isoprene rubber made can also be recovered from the solvent and residue by means such as decantation, filtration, centrification, and the like. Steam stripping can also be utilized in order to remove volatile organic compounds from the rubber.

The isoprene-butadiene rubbers made by the technique of this invention will typically have a glass transition temperature which is within the range of about −65° C. to about −110°. Such isoprene-butadiene rubbers will also generally have a Mooney viscosity which is within the range of about 50 to about 120. The isoprene-butadiene rubber will more typically have a Mooney viscosity which is within the range of 70 to 100.

The isoprene-butadiene rubbers made by the technique of this invention can be blended with other sulfur-vulcanizable rubbers to make compounds which have excellent characteristics for use in tire treads. For instance, improved rolling resistance and treadwear characteristics can be attained without sacrificing wet or dry traction characteristics. The isoprene-butadiene rubbers of this invention will normally be blended with other polydiene rubbers in making tire tread compounds. More specifically, the isoprene-butadiene rubber can be blended with natural rubber, high cis-1,4-polybutadiene, medium vinyl polybutadiene (having a glass transition temperature which is within the range of −10° C. to −40° C.), synthetic 1,4-polyisoprene, 3,4-polyisoprene (having a glass transition temperature which is within the range of −10° C. to −45° C.), styrene-butadiene rubbers (having a glass transition temperature which is within the range of 0° C. to −80° C.) and styrene-isoprene-butadiene rubbers (having a glass transition temperature which is within the range of −10° to −80° C.) to make useful tire tread compounds. A highly preferred blend for utilization in tire treads includes natural rubber, 3,4-polyisoprene rubber and the isoprene-butadiene rubber of this invention.

Various blend ratios can be employed in preparing tire tread compounds which exhibit a highly desirable combination of traction, rolling resistance, and tread wear characteristics. Another specific blend which is highly advantageous for utilization in tire tread compounds is comprised of about 40 weight percent to about 60 weight percent styrene-isoprene-butadiene rubber having a glass transition temperature which is within the range of about −70° C. to about −80° C. and from about 40 weight percent to about 60 weight percent of the isoprene-butadiene rubber prepared in accordance with the process of this invention.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment an isoprene-butadiene rubber was synthesized by the technique of this invention. In the procedure employed a one gallon (3.78 liter) reactor was charged with 1000 grams of a dry hexane solution containing 81.9 grams of 1,3-butadiene followed by 663 grams of 1.2 molar diisobutylaluminum hydride (DIBAH) in hexane (25 weight percent DIBAH). Then, a solution containing 21.5 grams of triphenylsilanol dissolved in 260 grams of toluene was charged into the reactor at a temperature of 18° C. and the contents of the reactor. After stirring for 40 minutes, a solution of 105.4 grams of 10.3% neodymium solution (as neodymium neodecanoate), diluted with 165 grams of dry hexane, was charged into the reactor. The solution was allowed to stir for one hour after which 19.1 grams of allylbromide was added. The cooling was stopped and the solution allowed to warm up to ambient temperatures. After stirring for about 90 minutes, the catalyst solution was heat aged at 65° C. for 1–2 hours. The aged catalyst solution was then cooled and stored in a dry container under nitrogen.

Then, 15.6 ml of the 0.025 molar aged neodymium catalyst solution (lanthanide containing catalyst component) was added to a solution containing 130 grams of isoprene and 130 grams of 1,3-butadiene in 1610 grams of dry hexane in a one gallon (3.78 liter) reactor under nitrogen at a temperature of 65° C. The polymerization was carried out with stirring for 3 hours. Periodically during the polymerization, samples of the polymerization solution were coagulated in a 60/40 volume percent mixture of ethanol/decane. The coagulated polymer was allowed to settle at −20° C. followed by gas chromatographic analysis of the supernatant liquid to determine the residual monomer content. Subtraction from the initial monomer concentrations allowed calculation of the individual monomer conversions. These analyses showed that the incorporation of butadiene to isoprene in the polymer was 3 to 2 by weight indicating the formation of a highly random, essentially non-tapered isoprene-butadiene rubber.

COMPARATIVE EXAMPLE 2

In this experiment the copolymerization of Example 1 was repeated using a standard neodymium catalyst system (DIBAH/Nd/Allylbromide/Bd:15/1/2/20 molar ratios) without the silanol modification of this invention. Gas chromatographic analyses of the residual monomers, as described in Example 1, showed the incorporation of butadiene to isoprene in the polymer was approximately 19 to 1 by weight, indicating the formation of a considerably less random, highly tapered copolymer.

EXAMPLE 3

In this experiment, an isoprene-butadiene copolymer rubber was prepared using an alcohol modified neodymium catalyst system. In this procedure, a one gallon (3.78 liter) reactor was charged with 1,214 grams of hexane containing 81.3 grams of butadiene and 558.43 grams of 1.23 molar diisobutylaluminum hydride (DIBAH) in hexane, (i.e., 25% weight percent DIBAH). The reactor was maintained at 20° C. by cooling. N-butanol (11.16 grams) was added with stirring. After stirring for thirty minutes, 107.5 grams of 10.1% neodymium solution (neodymium neodecanoate) diluted with 160 grams of dry hexane, was charged to the reactor. The solution was stirred for another thirty minutes after which time 18.2 grams of allyl bromide was added. The cooling was stopped and the solution was allowed to warm up. A delayed exothermic reaction was noted. After twenty minutes, bring the solution temperatures to about 10° C. above ambient temperature. When the temperature ultimately dropped, the catalyst solution was aged by heating at 65° C. for ninety minutes. The catalyst prepared had a [butanol-DIBAH]Nd-allyl bromide-butadiene molar ratio of [2-13]-1-2-20, respectively, and a concentration of 0.025 molarity with respect to the neodymium.

To a solution of 128.6 grams of isoprene and 129 grams of dry hexane in a one gallon (3.79 liter) reactor under nitrogen at 65° C., was added 20.7 milliliters (0.2 mmoles of neodymium/100 grams of total monomer [Bd+Ip]) of the above prepared catalyst. The polymerization was carried out with stirring for two hours and twenty minutes. Samples were taken during the polymerization as described in Example 1. Analyses of the samples showed that the incorporation of butadiene to isoprene (measured at low conversion) was 1.4/1 by weight indicating formation of a highly random, non-tapered isoprene-butadiene rubber. Yield= 87%. The Mooney of the dried rubber was 87; the Tg was −97° C.

EXAMPLE 4

In this experiment, an isoprene-butadiene copolymer was synthesized using an alcohol modified neodymium catalyst system with a different catalyst component molar ratio than that described in Example 3. In this procedure, a one gallon (3.78 liter) reactor was charged with 1,088 grams of hexane containing 93.5 grams of butadiene and 668 grams of 1.23 molar diisobutylaluminum hydride (DIBAH) in hexane (i.e., 25% weight percent DIBAH). To this solution was added 26.22 grams of n-butanol with stirring and with temperatures maintained at 20° C. After stirring for thirty minutes, 107.5 grams of a 10.1% neodymium solution (neodymium neodecanoate), dilute with 158 grams of dry hexane, was charged to the reactor. The solution was stirred for another thirty minutes after which time 21.4 grams of allyl bromide was added. The cooling was stopped and the mixture allowed to warmup to ambient (and above) temperature. After the exotherm subsided, requiring about one hour, the catalyst solution was heat aged at 65° C. for ninety minutes. The aged catalyst was then cooled and stored in a dry container under nitrogen. The catalyst prepared had a [butanol-DIBAH]Nd-allyl bromide-butadiene molar component ratio of [4.7-15.5]- 1-2.35-23, respectively, and a concentration of 0.025 molarity with respect to the neodymium.

Using the method described in Examples 1 and 3, a solution of 128 grams of isoprene and 128 grams of butadiene in 1,579 grams of dry hexane was polymerized using 29.6 milliliters of the above prepared catalyst. Samples of the polymerization batch at different time intervals showed a butadiene to isoprene incorporation ratio (measured at low conversion) of 1.35/1. After two hours and ten minutes, an 88% yield of the copolymer was obtained. A Mooney viscosity of the dried copolymer was 97; the Tg was −90° C.

EXAMPLE 5

In this experiment, an isoprene-butadiene copolymer was synthesized using an alcohol modified neodymium catalyst system modified with 1,4-butanediol. In this procedure, a one gallon (3.78 liter) reactor was charged with 1,093 grams of hexane containing 81.9 grams of butadiene and 663 grams of 1.2 molar diisobutylaluminum hydride (DIBAH) in hexane (i.e., 25% weight percent DIBAH). To this solution was then added 6.78 grams of 1,4-butanediol with stirring and with temperatures maintained at 20° C. The suspension of the butanediol gradually dissolved upon reacting with the DIBAH. After one hour of stirring, 105.4 grams of a 10.3% neodymium solution (neodymium neodecanoate), diluted with 165 grams of hexane, was added to the reactor. The solution was stirred for another thirty minutes after which time. 19.1 grams of allyl bromide was added. The cooling was stopped and the mixture allowed to warmup to ambient (and above) temperature. After the exotherm subsided, the catalyst solution was aged by heating at 65° C. for ninety minutes. The catalyst prepared had a [butanediol-DIBAH]-ND-allyl bromide-butadiene molar component ratio of [1-16]-1-2-20, respectively, and a concentration of 0.025 molarity with respect to the neodymium. The aged catalyst was then cooled and stored in a dry container under nitrogen.

Using the polymerization procedure described in the earlier examples, 123 grams of isoprene and 124 grams of butadiene in 1,546 grams of dry hexane was polymerized using 14.2 milliliters of the above prepared catalyst. Analyses of samples taken during the polymerization show the ratio of the incorporation of butadiene to isoprene (measured at low conversion) was 1.44/1. A yield of 87% was obtained after 130 minutes.

EXAMPLE 6

In this experiment, an isoprene-butadiene copolymer rubber was prepared using another rare earth metal, praseodymium. In the procedure employed, a one gallon (3.78 liter) reactor was charged with 1,000 grams of a dry hexane solution containing 82 grams of 1,3-butadiene, followed by 663 grams of a 1.2 molar diisobutylaluminum hydride (DIBAH) in hexane. A solution of 21.5 grams triphenylsilanol dissolved in 250 grams of toluene was then charged into the reactor at a temperature of 20° C. After stirring for about forty minutes, 85.9 grams of a 0.826 molar solution of praseodymium octoate, diluted with 195 grams of hexane, was charged to the reactor. The solution was allowed to stir for forty-five minutes after which 19.1 grams of allyl bromide was added. The cooling was stopped and the mixture was allowed to warmup to ambient temperature (and above). After stirring for about one hour, the catalyst system was aged by heating at 65° C. for ninety minutes. The catalyst prepared had a [silanol-DIBAH]-Pr-allyl bromide-butadiene component molar ratio of [1-15]-1-2-20, respectively, and a concentration of 0.025 molarity with respect to the neodymium. The aged catalyst was then cooled and stored in a dry container under nitrogen.

Using the polymerization procedure described in Examples 1 and 3, 124 grams of isoprene and 125 grams of butadiene in 1,439 grams of dry hexane were polymerized using 19.6 milliliters of the above praseodymium-based catalyst. Samples of the polymerization solution during the run showed that the rate of incorporation of the butadiene to isoprene (measured at low conversion) was 1.7/1 by weight. A yield of 37% was obtained after one hour and forty minutes. The Mooney of the dried sample was 64; the Tg was −96° C.

COMPARATIVE EXAMPLE 7

In this experiment, the copolymerization of Example 6 was repeated with a praseodymium-based catalyst prepared as described in Example 6 except without the triphenylsilanol modifier.

Analyses of the samples of the copolymerization showed that the rate of incorporation of the butadiene to isoprene (measured at low conversion) was 16/1 by weight, indicating formation of a somewhat tapered copolymer, in contrast to the highly random copolymer formed when the triphenylsilanol catalyst modifier was employed.

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of isoprene-butadiene rubbers which comprises copolymerizing isoprene monomer and 1,3-butadiene monomer in an organic solvent in the presence of a catalyst system which is made by the sequential steps of (1) mixing (a) an organoaluminum hydride, (b) an aliphatic alcohol containing from 1 to 12 carbon atoms, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; and (3) adding a compound which contains at least one labile halogen atom to the Group III-B metal containing catalyst component.

2. A process as specified in claim 1 which further comprises aging the catalyst system after the compound which contains at least one labile halogen atom is added to the modified Group III-B metal containing catalyst component for a period of 10 minutes to 6 hours.

3. A process as specified in claim 2 wherein the catalyst system is aged at a temperature which is within the range of about 30° C. to about 85° C.

4. A process as specified in claim 1 wherein the Group III-B metal in the organometallic compound is a lanthanide selected from the group consisting of cerium, praseodymium, neodymium, and gadolinium.

5. A process as specified in claim 1 wherein the aliphatic alcohol is 1-butanol.

6. A process as specified in claim 1 wherein the copolymerization is conducted at a temperature which is within the range of about 30° C. to about 85° C.

7. A process as specified in claim 6 wherein the organic solvent contains from about 5 weight percent to about 35 weight percent monomers.

8. A process as specified in claim 7 wherein the catalyst system is present at a level sufficient to provide from 0.05 to 0.5 millimoles of the Group III-B metal per 100 grams of total monomers.

9. A process as specified in claim 1 wherein the Group III-B metal in the organometallic compound is neodymium.

10. A process as specified in claim 9 wherein the molar ratio of the organoaluminum hydride to the aliphatic alcohol is within the range of about 3:2 to about 150:1.

11. A process as specified in claim 9 wherein the molar ratio of the organoaluminum hydride to the aliphatic alcohol is within the range of about 2:1 to about 100:1.

12. A process as specified in claim 9 wherein the molar ratio of the organoaluminum hydride to the aliphatic alcohol is within the range of about 5:2 to about 25:1.

13. A process as specified in claim 9 wherein the molar ratio of the organoaluminum hydride to the aliphatic alcohol is within the range of about 3:1 to about 15:1.

14. A process as specified in claim 11 wherein the molar ratio of the 1,3-butadiene used in making the catalyst system to the organometallic compound which contains a metal from Group III-B of the Periodic System is greater than 3:1.

15. A process as specified in claim 11 wherein the molar ratio of the 1,3-butadiene used in making the catalyst system to the organometallic compound which contains a metal from Group III-B of the Periodic System is within the range of about 5:1 to about 100:1.

16. A process as specified in claim 11 wherein the molar ratio of the 1,3-butadiene used in making the catalyst system to the organometallic compound which contains a metal from Group III-B of the Periodic System is within the range of about 10:1 to about 30:1.

17. A process as specified in claim 11 wherein the molar ratio of the 1,3-butadiene used in making the catalyst system to the organometallic compound which contains a metal from Group III-B of the Periodic System is within the range of about 15:1 to about 25:1.

18. A process as specified in claim 1 wherein the organometallic compound which contains a metal from Group III-B of the Periodic System is an organolanthanide compound selected from the group consisting of cerium acetylacetonate, cerium naphthenate, cerium neodecanoate, cerium octanoate, tris-salicylaldehyde cerium, cerium tris-8-hydroxyquinolate), gadolinium naphthenate, gadolinium neodecanoate, gadolinium octanoate, lanthanum naphthenate, lanthanum octanoate, neodymium naphthenate, neodymium neodecanoate, neodymium octanoate, praseodymium naphthenate, praseodymium octanoate, yttrium acetylacetonate, yttrium octanoate, and dysprosium octanoate.

19. A process as specified in claim 9 wherein the organoaluminum hydride has the structural formula:

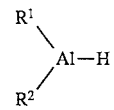

wherein $R^1$ and $R^2$ can be the same or different and represent alkyl groups containing from 1 to about 12 carbon atoms.

20. A process as specified in claim 19 wherein $R^1$ and $R^2$ represent alkyl groups which contain from about 2 to about 8 carbon atoms.

21. A process as specified in claim 19 wherein $R^1$ and $R^2$ represent alkyl groups which contain from about 3 to about 6 carbon atoms.

22. A process as specified in claim 11 wherein the molar ratio of the amount of the compound containing the labile halogen atom added to the neodymium metal in the neodymium containing catalyst component is within the range of about 1:1 to about 5:1.

23. A process as specified in claim 11 wherein the molar ratio of the amount of the compound containing the labile halogen atom added to the neodymium metal in the neodymium containing catalyst component is within the range of about 3:2 to about 3:1.

24. A process as specified in claim 11 wherein the molar ratio of the amount of the compound containing the labile halogen atom added to the neodymium metal in the neodymium containing catalyst component is within the range of about 1.8:1 to about 5:2.

* * * * *